(12) United States Patent
Lawrence et al.

(10) Patent No.: US 9,394,498 B2
(45) Date of Patent: Jul. 19, 2016

(54) PELLETIZED FUEL PRODUCTS, METHODS, AND APPARATUSES

(71) Applicant: Novus Technology, Incorporated, Northport, AL (US)

(72) Inventors: William J. Lawrence, Meridian, MS (US); James Grady Coble, III, Fernandina Beach, FL (US)

(73) Assignee: Novus Technology, Incorporated, Northport, AL (US)

( * ) Notice: Subject to any disclaimer, the term of this patent is extended or adjusted under 35 U.S.C. 154(b) by 210 days.

(21) Appl. No.: 13/915,401

(22) Filed: Jun. 11, 2013

(65) Prior Publication Data
US 2013/0326939 A1    Dec. 12, 2013

Related U.S. Application Data

(60) Provisional application No. 61/658,396, filed on Jun. 11, 2012.

(51) Int. Cl.
| | |
|---|---|
| *C10L 5/00* | (2006.01) |
| *C10L 5/44* | (2006.01) |
| *C10L 5/36* | (2006.01) |
| *C10L 9/08* | (2006.01) |

(52) U.S. Cl.
CPC .............. *C10L 5/447* (2013.01); *C10L 5/363* (2013.01); *C10L 9/083* (2013.01); *C10L 9/086* (2013.01); *Y02E 50/10* (2013.01); *Y02E 50/15* (2013.01); *Y02E 50/30* (2013.01)

(58) Field of Classification Search
CPC ......... C10L 5/447; Y02E 50/10; Y02E 50/15; Y02E 50/30
See application file for complete search history.

(56) References Cited

U.S. PATENT DOCUMENTS

| | | | | |
|---|---|---|---|---|
| 1,550,034 | A | * | 8/1925 | Leuenberger .............. C10L 5/44 44/564 |
| 3,689,233 | A | * | 9/1972 | Veloso ............................ 44/589 |
| 4,324,561 | A | | 4/1982 | Dean et al. |
| 2007/0266623 | A1 | | 11/2007 | Paoluccio |
| 2009/0250331 | A1 | | 10/2009 | Hopkins et al. |
| 2010/0101141 | A1 | | 4/2010 | Shulenberger et al. |
| 2011/0041392 | A1 | | 2/2011 | Stromberg et al. |
| 2011/0252698 | A1 | | 10/2011 | Camper et al. |
| 2013/0031830 | A1 | | 2/2013 | Steele et al. |

FOREIGN PATENT DOCUMENTS

| | | | |
|---|---|---|---|
| DE | 116261 | A1 | 11/1975 |
| DE | 102004048559 | * | 4/2006 |
| DE | 102004048559 | A1 | 4/2006 |
| WO | 2010093310 | A1 | 8/2010 |
| WO | 2011041880 | A1 | 4/2011 |

OTHER PUBLICATIONS

Axel Funke and Felix Ziegler: "Hydrothermal carbonization of biomass: A summary and discussion of chemical mechanisms for process engineering," Biofuels, Bioproducts & Biorefining, vol. 4, No. 2, Mar. 1, 2010, pp. 160-177.
Sevilla M. et al: "Chemical and Structural Properties of Carbonaceous Products Obtained by Hydrothermal Carbonization of Saccharides," Chemistry—A European Journal, vol. 15, No. 16, Apr. 14, 2009, pp. 4195-4203.
International Search Report and Written Opinion for PCT/US2013/045243, mailed Aug. 21, 2013, European Patent Office.

* cited by examiner

*Primary Examiner* — Cephia D Toomer
(74) *Attorney, Agent, or Firm* — Sutherland Asbill & Brennan LLP

(57) ABSTRACT

Pelletized fuel products, methods, and apparatuses are provided. The method includes pelletizing at least partially carbonized biomass in an inert atmosphere. The apparatus includes a feeder of at least partially carbonized biomass, a pelletizer configured to receive and pelletize the at least partially carbonized biomass, and an inert gas source configured to provide inert gas to the pelletizer.

14 Claims, 2 Drawing Sheets

.US 9,394,498 B2

PELLETIZED FUEL PRODUCTS, METHODS, AND APPARATUSES

CROSS-REFERENCE TO RELATED APPLICATIONS

This application claims the benefit of U.S. Provisional Application No. 61/658,396, filed Jun. 11, 2012, which is incorporated herein by reference in its entirety.

TECHNICAL FIELD

The present invention relates generally to the field of fuel products, and more particularly to pelletized biomass-based fuel products and methods and apparatuses for producing the same.

BACKGROUND

Biomass-based fuel products are desirable because they provide a renewable energy source and an eco-friendly alternative to coal and other fossil fuels. Processes such as torrefaction are known to produce at least partially carbonized biomass-based fuel products offering increased energy value and improved combustion properties over the raw biomass. Densification and pelletization processes are known to transform the at least partially carbonized biomass into more useful forms for storage, shipping, and handling. Densification and pelletization processes, however, experience handling problems. It would therefore be desirable to provide improved methods and apparatuses for producing pelletized, torrefied biomass-based fuel products.

SUMMARY

In one aspect, a method for producing a pelletized fuel product is provided. The method includes pelletizing at least partially carbonized biomass in an inert atmosphere. In one embodiment, the at least partially carbonized biomass includes torrefied wood or hydrothermally carbonized wood. In one embodiment, the inert atmosphere includes an inert gas selected from the group consisting of nitrogen, carbon dioxide, and steam.

In another aspect, an apparatus for producing a pelletized fuel product is provided. The apparatus includes a feeder of at least partially carbonized biomass, a pelletizer configured to receive and pelletize the at least partially carbonized biomass, and an inert gas source configured to provide inert gas to the pelletizer. In one embodiment, the apparatus further includes a water source configured to moisten the at least partially carbonized biomass to a moisture content of between about 2 percent and about 40 percent by weight of the at least partially carbonized biomass prior to pelletization.

In yet another aspect, a method for producing a pelletized carbonized fuel product is provided. The method includes at least partially carbonizing a biomass feed to produce at least partially carbonized biomass, and thereafter pelletizing the at least partially carbonized biomass in an inert atmosphere to produce a pelletized carbonized fuel product. In one embodiment, the step of at least partially carbonizing a biomass feed comprises torrefying the biomass feed or hydrothermally carbonizing the biomass feed.

In another aspect, an apparatus for producing a pelletized carbonized fuel product is provided. The apparatus includes a feeder of raw biomass, a reactor configured to receive and at least partially carbonize the raw biomass, a pelletizer configured to receive and pelletize the at least partially carbonized biomass, and an inert gas source configured to provide inert gas to the pelletizer. In one embodiment, the reactor is a torrefaction reactor or a hydrothermal carbonization reactor.

DETAILED DESCRIPTION

Figure 1:
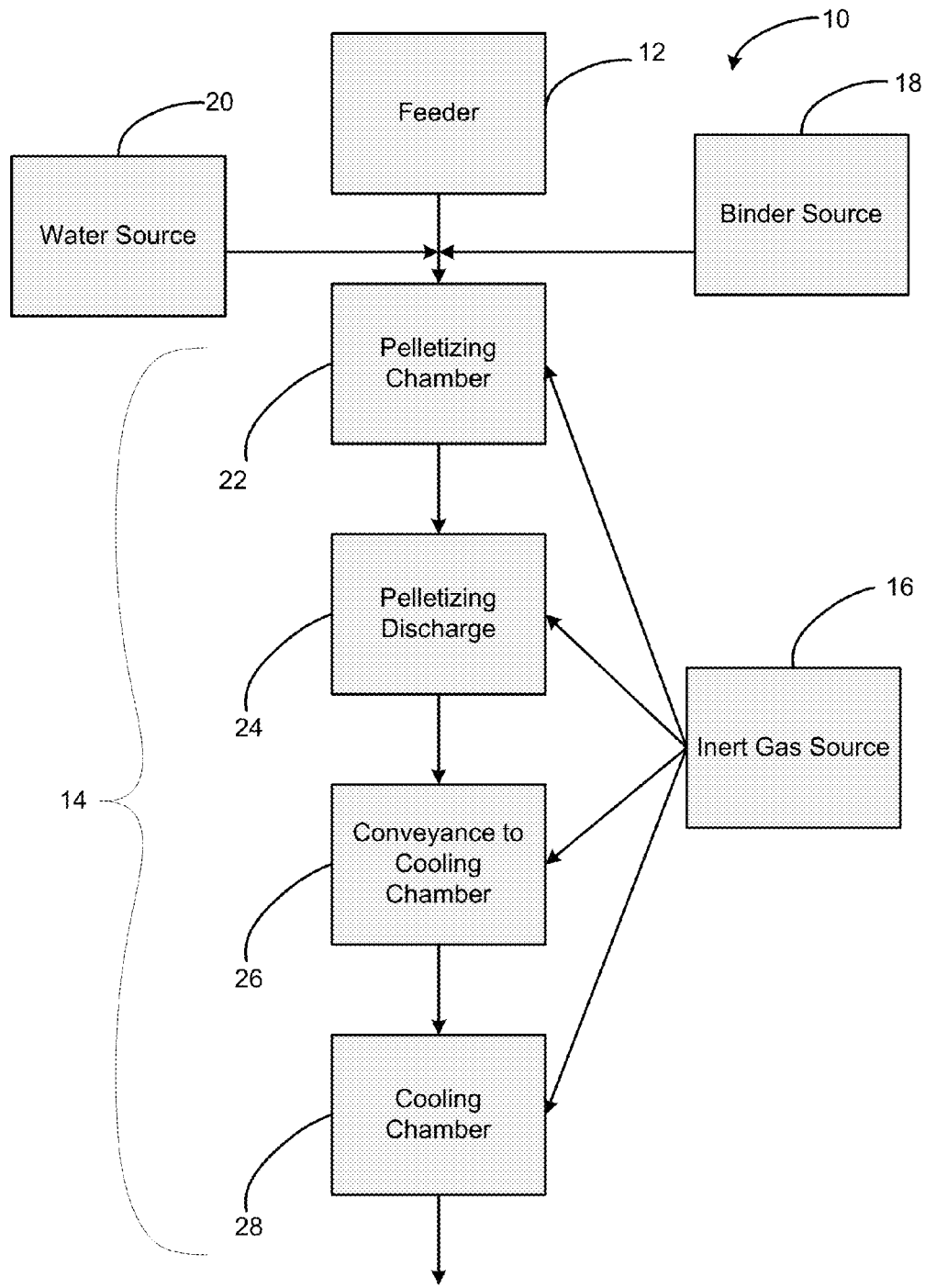
FIG. 1 is a schematic diagram illustrating one embodiment of an apparatus for producing a pelletized fuel product.

The present application will now be described more fully hereinafter with reference to the accompanying drawings, in which several embodiments of the application are shown. Like numbers refer to like elements throughout the drawings.

In the following description, numerous specific details are given to provide a thorough understanding of embodiments. The embodiments can be practiced without one or more specific details, or with other methods, components, materials, and the like. In other instances, well known structures, materials, or operations are not shown or described in detail to avoid obscuring aspects of the embodiments.

Reference throughout the specification to "one embodiment," "an embodiment," or "embodiments" means that a particular feature, structure, or characteristic described in connection with the embodiment is included in at least one embodiment. Thus, the appearances of the phases "in one embodiment" or "in an embodiment" in various places throughout the specification are not necessarily referring to the same embodiment. Furthermore, the particular features, structures, or characteristics may be combined in any suitable manner in one or more embodiments.

Carbonization processes are known that convert organic substances into carbon or carbon-containing residue. As used herein, the terms "carbonize" and "carbonized" refer to these processes and their products. For example, processes such as torrefaction and hydrothermal carbonization convert raw biomass to at least partially carbonized products having increased mass energy density.

As used herein, the term "biomass" refers to renewable organic materials such as biological materials comprising lignocellulose including hardwood and softwood from trees, wood chips, slash or hog fuel from softwood tree processing, forest residue, straw, chaff, grain, grasses, corn, corn husk, weeds, aquatic plants, and hay, and lignocellulose containing material of biological origin, such as some municipal waste or household waste. Woody biomass is mainly composed of hemicellulose, cellulose, lignin, and small amounts of ash. The structure is a complex arrangement of microfibrils, or bundles of cellulose covered with hemicellulose. Lignin fills the voids between the microfibrils and is sometimes embedded within the amorphous portions of the microfibrils. Each component of the woody biomass displays a unique thermal stability, with hemicellulose decomposing between 225 and 325° C., cellulose decomposing between 305 and 375° C., and lignin decomposing between 250 and 500° C.

Torrefaction refers to the heating of biomass to produce a product having increased mass energy density that can be used as a fuel. Generally, torrefaction may be performed on biomass at temperatures between about 200° C. and about 300° C. After a residence time, the biomass partially decomposes, giving off volatiles such as syngas. Accordingly, torrefaction is commonly performed in the absence of oxygen to prevent ignition of the biomass during torrefaction. The process produces a final product known as "torrefied biomass" or "torrefied wood" when produced from woody biomass. Torrefaction offers a promising biomass upgrading option, as the physical properties of the torrefied solids are similar to those of coal.

During torrefaction, the hemicellulose is the removed to a greater extent than the other components of the biomass. The hemicellulose displays an initial rapid decomposition rate followed by a more lengthy secondary charring with increased holding time. Portions of lignin have been observed to decompose or transform during torrefaction, while cellulose maintains its crystalline structure. The removal of hemicellulose results in a physiochemical transformation of the solid woody biomass material. Elemental analysis of torrefied wood has shown that the fractional makeup of carbon is increased by up to 15-20% while oxygen is reduced by up to 50%. As a result, the atomic ratios of H/C and O/C are reduced from approximately 1.64 to 1.11 and from 0.82 to 0.49, respectively.

The resulting torrefied wood solids offer great promise in renewable combustion opportunities and syngas production due to their increased energy value, friability, and hydrophobic nature. Densification and pelletization of the torrefied solids are desirable to improve ease of handling and storage of the fuel product, i.e., by transforming the product into uniform, high-density pellets; however, these processes experience many problems.

Conventional wisdom suggests that because much of the original hemicellulose is liberated during the torrefaction process, there remains a higher proportion of lignin on a per unit basis of total solid mass than before the reaction occurred. Therefore, adequate amounts of lignin remain to sufficiently bind the solids during pelletization or densification. However, at the reaction temperatures necessary to complete torrefaction, the glass transition temperature of the lignin is altered. In other words, the temperature required to initiate re-bonding of the lignin is increased. The absence of water, considered to be a positive attribute in the torrefaction process, is also believed to play a role in altering the glass transition temperature of the remaining lignin.

In an effort to reach higher temperatures to achieve reactions with the residual lignin to bind the solids, conventional pellet presses would have to be operated at temperatures beyond current technological limits. While several technologies offer promising results for making high temperature pellets, these technologies are tedious, expensive, and presently unavailable for commercialization.

High-temperature operation introduces another serious drawback to pelletization, namely syngas production. As higher temperatures are reached in an effort to initiate lignin reactivity, the previously reacted materials liberate significant amounts of syngas composed of a mixture of carbon monoxide, hydrogen, carbon dioxide, methane, nitrogen, and small amounts of hydrocarbons. This thermo-chemical conversion is further encouraged by the altered friability of the remaining solids, which is now much greater, and by a solids particle size that is quickly reduced to micron size as the solid is introduced to the feed rollers, pellet rams or pellet dies. The resulting product is an ultra-fine particle with a greater surface area than that of the original torrefied solids and consequently is highly pyrophoric. While desirable for the end use of the product, the pyrophoric nature of the product creates a hazard to personnel and equipment during the densification and pelletization process and remains problematic for the successful formation of torrefied pellets.

To avoid the drawbacks associated with high-temperature pelletization, Applicants have developed a novel process that allows for the densification and pelletization of torrefied biomass, hydrothermal carbonized biomass, and other chars without the use of temperatures exceeding the technological limits of conventional pellet presses. Applicants discovered that low-temperature pelletization utilizing a binder as a substitute for the lignin also involved many challenges and drawbacks. Specifically, Applicants discovered that once a pelletization unit reaches temperatures adequate for pellet formation, explosions and hollow core pellets occur, despite operating temperatures well below the flashpoint of torrefied wood. Without intending to be bound by a particular theory, Applicants believe that fine particles of torrefied wood in the pelletizer emit hydrogen gas and carbon monoxide even at very low temperatures, resulting in highly pyrophoric properties. While considerable teaching exists in the literature regarding the liberation of torrefaction gases, this discovery was surprising.

Applicants discovered that lower pelletization temperatures combined with an inert environment yields less spontaneous and unintentional combustion reactions during pelletization and results in an improvement in machine uptime and yield. Applicants believe this limits the amount of syngas produced during the pelletization process and offers the user an opportunity to operate an array of pelletization equipment in the absence of increased syngas hazards.

To maintain margins of safety with the finished pelletized product, the formation of robust pellets is necessary to reduce the pyrophoric nature of the product. Applicants found that properly formed pellets or briquettes will significantly reduce the fire hazard by removing the small particle sizes prone to spontaneous combustion. The robustness of the pellet is necessary to maintain this density during storage and transportation. If particle size is allowed degrade to a small fraction in an oxygen rich environment, the risk of unintentional combustion will likely increase due to continued liberation of syngas.

In one aspect, a method is provided for producing a pelletized fuel product, which includes pelletizing at least partially carbonized biomass in an inert atmosphere. In certain embodiments, the at least partially carbonized biomass comprises torrefied wood or hydrothermally carbonized wood. The at least partially carbonized biomass may also include coal and/or char. In one embodiment, the method includes applying a binder to the at least partially carbonized biomass prior to the step of pelletization. The binder may be a starch-based binder or a waterproof binder. For example, the binder may include defatted or full-fatted soybeans. In one embodiment, the binder may be as described in pending U.S. patent application Ser. No. 13/367,138, filed on Feb. 2, 2012 and entitled "Methods For Producing Binders and Combustible Composite Materials and Compositions Produced Therefrom, now U.S. Pat. No. 9,133,341" the disclosure of which is incorporated herein by reference in its entirety.

In one embodiment, the inert atmosphere includes an inert gas selected from the group consisting of nitrogen, carbon dioxide, and steam. Other inert gasses may also be used. The inert atmosphere may be substantially free of excess oxygen. In one embodiment, the inert atmosphere includes an oxygen displacing fluid. For example, the inert atmosphere may include an oxygen displacing foam or other material that renders the pelletizer substantially oxygen-free. In one embodiment, the inert atmosphere includes a glycerin foam, alone or in combination with an inert gas. Other foams may also be used. For example, an inert gas may be used to foam a foaming material. The foam may aid in capturing the inert gas and maintaining the inert gas with the at least partially carbonized biomass during subsequent processing.

In one embodiment, the method includes applying water to the at least partially carbonized biomass prior to the step of pelletization. In one embodiment, the at least partially carbonized biomass has a moisture content of from about 2 percent to about 40 percent, from about 2 percent to about 30 percent, from about 5 percent to about 30 percent, or from about 10 percent to about 30 percent by weight of the at least partially carbonized biomass. For example, water may be applied to the at least partially carbonized biomass such that it obtains a moisture content of about 10 percent by weight of the at least partially carbonized biomass or from about 2 percent to about 40 percent by weight of the at least partially carbonized biomass. In certain embodiments, where the at least partially carbonized biomass contains moisture, the step of pelletizing may produce steam from the biomass that acts as at least a portion of the inert gas of the inert atmosphere.

In another aspect, a method for producing a pelletized carbonized fuel product is provided. The method includes at least partially carbonizing a biomass feed to produce at least partially carbonized biomass, and thereafter pelletizing the at least partially carbonized biomass in an inert atmosphere to produce a pelletized at least partially carbonized biomass fuel product. In one embodiment, the step of at least partially carbonizing a biomass feed includes torrefying the biomass feed or hydrothermally carbonizing the biomass feed. For example, the biomass feed may include wood. In one embodiment, the method includes applying a binder to the at least partially carbonized biomass prior to the step of pelletization. In one embodiment, the method includes applying water to the at least partially carbonized biomass prior to the step of pelletization such that the at least partially carbonized biomass has a moisture content of at least about ten percent or from about 2 percent to about 40 percent by weight of the at least partially carbonized biomass.

In another aspect, an apparatus for producing a pelletized fuel product is provided. As shown in FIG. 1, the apparatus 10 includes a feeder 12 of at least partially carbonized biomass, a pelletizer 14 configured to receive and pelletize the at least partially carbonized biomass, and an inert gas source 16 configured to provide inert gas to the pelletizer 14. In certain embodiments, the at least partially carbonized biomass includes torrefied wood or hydrothermally carbonized wood. In one embodiment, the inert gas includes nitrogen, carbon dioxide, or steam.

In certain embodiments, the pelletizer 14 includes one or more of the following components: a pelletizing chamber 22, a pelletizing discharge 24, a conveyance to cooling chamber 26, and a cooling chamber 28. In a preferred embodiment, the pelletizer includes pelletizing chamber 22. Inert gas source 16 may be configured to provide inert gas to any or all components of pelletizer 14. Separate inert gas sources may also provide inert gas to the individual components of the pelletizer.

In one embodiment as shown in FIG. 1, the apparatus 10 includes a water source 20 configured to moisten the at least partially carbonized biomass to a moisture content of at least about ten percent prior to pelletization. The apparatus 10 also may include a binder source 18 configured to introduce a binder to the at least partially carbonized biomass prior to pelletization. For example, the binder may be introduced to the at least partially carbonized biomass such that the biomass contains binder in an amount from about 0.5 percent to about 15 percent, from about 1 percent to about 10 percent, or from about 2 percent to about 5 percent by weight of the at least partially carbonized biomass. In one embodiment, the biomass may contain binder in an amount of about 2.5 percent by weight of the at least partially carbonized biomass.

Figure 2:
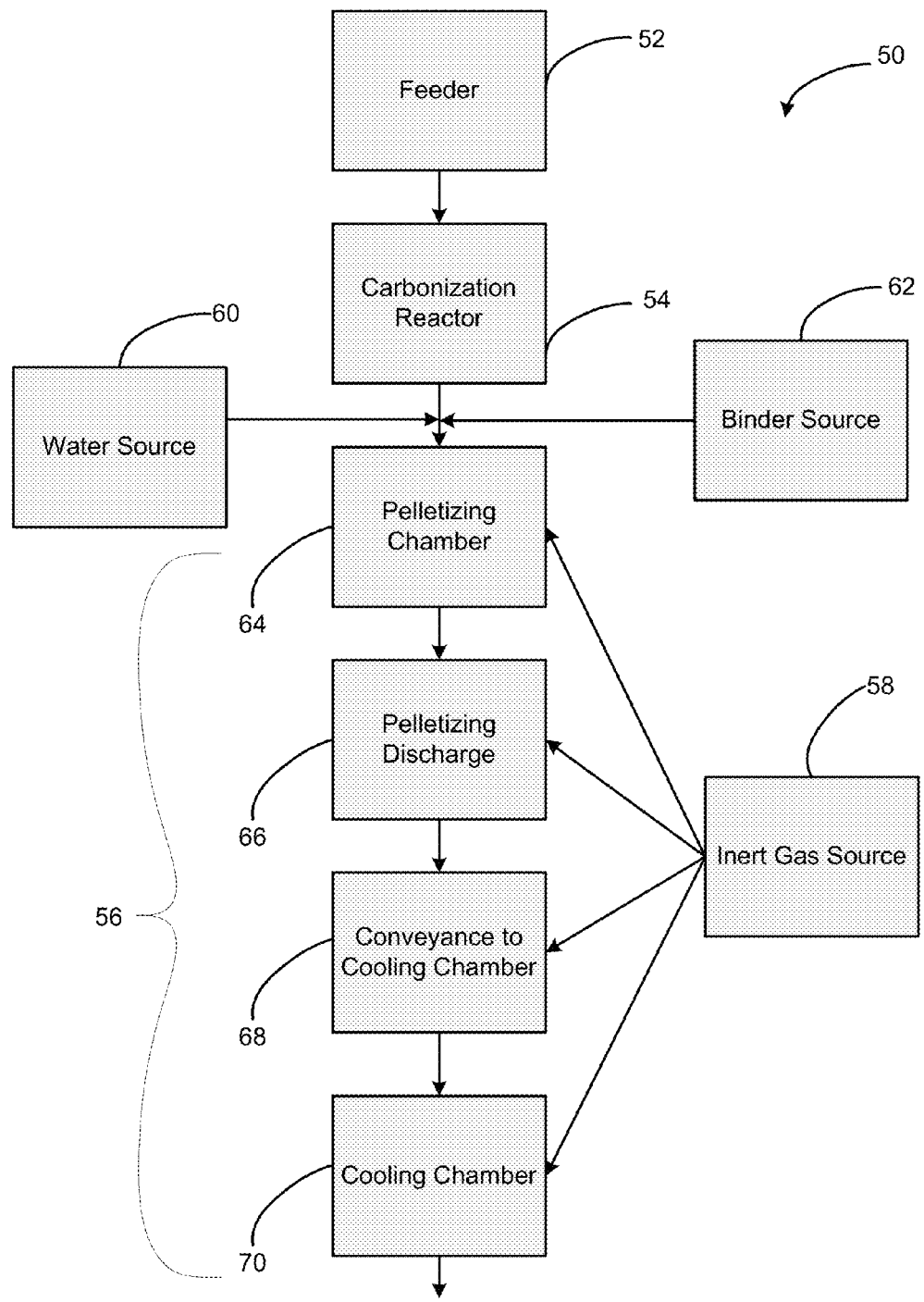
FIG. 2 is a schematic diagram illustrating one embodiment of an apparatus for producing a pelletized carbonized fuel product.

In another aspect, an apparatus for producing a pelletized fuel product is provided. As shown in FIG. 2, the apparatus 50 includes a feeder 52 of raw biomass, a reactor 54 configured to receive and at least partially carbonize the raw biomass, a pelletizer 56 configured to receive and pelletize the at least partially carbonized biomass, and an inert gas source 58 configured to provide inert gas to the pelletizer. In one embodiment, the raw biomass includes wood. In certain embodiments, the reactor is a torrefaction reactor or a hydrothermal carbonization reactor.

In certain embodiments, the pelletizer 56 includes one or more of the following components: a pelletizing chamber 64, a pelletizing discharge 66, a conveyance to cooling chamber 68, and a cooling chamber 70. In a preferred embodiment, the pelletizer includes pelletizing chamber 64. Inert gas source 58 may be configured to provide inert gas to any or all components of pelletizer 56. Separate inert gas sources may also provide inert gas to the individual components of the pelletizer.

In one embodiment as shown in FIG. 2, the apparatus 50 includes a water source 60 configured to moisten the at least partially carbonized biomass to a moisture content of at least about ten percent prior to pelletization. The apparatus 50 may also include a binder source 62 configured to introduce a binder to the at least partially carbonized biomass prior to pelletization.

The pelletizing chamber may include any known pellet-producing mechanism. For example, the pelletizing chamber may be a small ring die pellet mill, a commercial scale ring die pellet mill, a punch-and-die pellet machine, or a pellet press or the like. For example, the die may be an 8 mm die.

Publications cited herein and the materials for which they are cited are specifically incorporated by reference herein. Modifications and variations of the methods and compositions described herein will be obvious to those skilled in the art from the foregoing detailed description. Such modifications and variations are intended to come within the scope of the appended claims.

We claim:

1. A method for producing a pelletized fuel product, the method consisting essentially of:
    applying water to at least partially carbonized biomass such that the at least partially carbonized biomass has a moisture content from about 2 percent to about 40 percent by weight of the at least partially carbonized biomass; and thereafter
    pelletizing the at least partially carbonized biomass in an inert atmosphere,
    wherein at least a portion of the inert atmosphere comprises steam and at least a portion of the steam is produced during pelletization of the at least partially carbonized biomass.

2. The method of claim 1, wherein the at least partially carbonized biomass comprises torrefied wood or hydrothermally carbonized wood.

3. The method of claim 2, wherein the at least partially carbonized biomass further comprises at least one of coal or char.

4. The method of claim 1, wherein the inert atmosphere is free of excess oxygen.

5. The method of claim 1, wherein the inert atmosphere comprises an oxygen displacing fluid.

6. A method for producing a pelletized fuel product, the method comprising:
    applying a mixture to at least partially carbonized biomass, the mixture consisting essentially of water and a binder; and thereafter pelletizing a combination of the mixture and the at least partially carbonized biomass in an inert atmosphere, wherein at least a portion of the inert atmosphere comprises steam and at least a portion of the steam is produced during pelletization of the at least partially carbonized biomass.

7. The method of claim 6, further comprising at least partially carbonizing a biomass feed to produce the at least partially carbonized biomass prior to the step of applying the mixture thereto.

8. The method of claim 6, wherein the mixture is applied to the at least partially carbonized biomass in an amount such that, prior to pelletizing, the at least partially carbonized biomass has a moisture content from about 2 percent to about 40 percent by weight of the at least partially carbonized biomass.

9. The method of claim 6, wherein the mixture is applied to the at least partially carbonized biomass in an amount such that, prior to pelletizing, the binder is present in the at least partially carbonized biomass in an amount from about 0.5 percent to about 15 percent by weight of the at least partially carbonized biomass.

10. The method of claim 6, wherein the at least partially carbonized biomass comprises torrefied wood or hydrothermally carbonized wood.

11. The method of claim 10, wherein the at least partially carbonized biomass further comprises at least one of coal or char.

12. The method of claim 6, wherein the inert atmosphere is free of excess oxygen.

13. The method of claim 6, wherein the inert atmosphere comprises an oxygen displacing fluid.

14. A method for producing a pelletized fuel product, the method comprising:

applying a mixture to at least partially carbonized biomass, the mixture consisting essentially of water and a binder; and thereafter pelletizing a combination of the mixture and the at least partially carbonized biomass in an inert atmosphere, wherein the inert atmosphere comprises an oxygen displacing fluid.

* * * * *